3,754,085
PHOSPHONIC ACID ANTI-FIBRINOLYTIC AGENTS
Burton G. Christensen, Scotch Plains, N.J., William J. Leanza, Staten Island, N.Y., and Lewis H. Sarett, Skillman, N.J., assignors to Merck & Co., Inc., Rahway, N.J.
No Drawing. Original application June 11, 1970, Ser. No. 45,555. Divided and this application July 19, 1971, Ser. No. 164,047
Int. Cl. A61k 27/00
U.S. Cl. 424—211                                    1 Claim

ABSTRACT OF THE DISCLOSURE

Novel substituted or unsubstituted benzene and cyclohexane phosphonic acids. The phosphonic acids disclosed herein are potent anti-fibrinolytic agents. Also included herein are pharmaceutical compositions containing said phosphonic acid compounds as an active ingredient and methods of treating fibrinolytic states in patients by administering said compounds. Further encompassed is a substituted benzene phosphonic acid known to the art having novel anti-fibrinolytic activity.

---

This application is a division of U.S. Ser. No. 45,555, filed June 11, 1970 which is still pending.

This invention relates to novel substituted or unsubstituted benzene and cyclohexane phosphonic acids, pharmaceutically acceptable salts thereof and methods for preparing said compounds. Also included within the scope of the invention are pharmaceutical compositions containing said phosphonic acid compounds as active ingredients. The novel phosphonic acids of the invention are potent anti-fibrinolytic agents which are effective in the method of counteracting certain hemorrhagic conditions and other disorders resulting from pathological fibrinolytic states in patients.

The dissolution of fibrin deposits in mammals is due to their lysis by the enzyme plasimin (fibrinolysin) which is formed in the blood from plasminogen, also present in the blood. This conversion from plasminogen to plasmin is promoted by activators in the blood and it would appear that excessive fibrinolytic activity results from an over-abundance of such activators. When too much plasmin is present, the clotting system of the blood becomes unbalanced, viable clots cannot be maintained, and hemorrhage may result. This situation is known as a fibrinolytic state. Other enzyme systems (i.e., the kallikreins, complement) may also be activated in an undesirable manner when such a state exists.

An interest has recently developed in anti-fibrinolytic agents, i.e. drugs which will inhibit the activation of plasminogen ot form plasmin. These anti-fibrinolytic agents are believed to interfere with the function of the activators of converting plasminogen to plasmin. The clinical uses of such drugs include their administration to persons undergoing various kinds of surgery (such as heart-lung and prostate surgery), obstetrical hemorrhage problems, menorrhagia, and many other uses which have been suggested in the literature (e.g. see Nilssen, Acta Medica, Scand. Suppl., 180, 448 (1966).

The novel anti-fibrinolytic phosphonic acid compounds of this invention are represented by the following general structures:

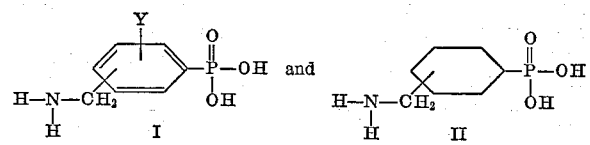

wherein Y is halogen such as bromine, chlorine, fluorine, and the like.

In a continued search for potent anti-fibrinolytic compounds, we have found a class of novel phosphonic acids which are active anti-fibrinolytic agents. Further encompassed within the scope of the invention is 4-aminomethyl benzene phosphonic acid, a compound known to the art [Doak & Freedman, Journal of American Chemical Society, 81:3021 (1959)], but not as an anti-fibrinolytic agent. This known compound has been found to possess potent antifibrinolytic activity.

This invention may be better understood from the details shown below. In the preparation of the novel compounds of Formula I, 2-halo-phosphanilic acid and 3-halo-phosphanilic acid are used as the starting materials. The starting materials may be prepared according to the procedure of U.S. Pat. 3,442,938. 2-halo-phosphanilic acid is treated with an acid, diazotizing agent, base and a nitrile generating reagent such as sodium cyanide, which is employed in the presence of cuprous halide to obtain 2-halo-4-cyano-benzene-phosphonic acid. This compound is then treated with a base and hydrogenated with an agent such as ruthenium/carbon to yield 2-halo-4-aminomethylbenzene - phosphonic acid. Similarly, 3 - halo-4-aminomethylbenzene-phosphonic acid, 2 - halo - 5-amino-methyl-benzene-phosphonic acid and 3 - halo - 5 - aminomethyl-benzene-phosphonic acid are prepared by the same procedure using 3-halo-4-phosphanilic acid, 2-halo-5-phosphanilic acid and 3-halo-5-phosphanilic acid as starting materials respectively.

The cis compounds of Formula II are prepared by treating o, m, or p-aminomethyl-benzene-phosphonic acid with an acid and hydrogenating acid cis compound in the presence of a catalyst such as rhodium/alumina to obtain cis o, m, or p-aminomethyl-cyclohexane-phosphonic acid. The trans-compounds of Formula II are prepared by hydrogenating the known o, m, or p-carboxy-benzene-phosphonic acid to obtain o, m, or p-carboxy-cyclohexane-phosphonic acid. This compound is esterified to obtain predominantly cis-o, m, or p-methoxycarbonyl-cyclo-hexane-phosphonic acid, which is then amidated to yield predominantly trans-o, m, or p-carbamoyl-cyclohexane-phosphonic acid. The acid halide, trans-o, m, or p-cyano-cyclohexane-phosphonyl dihalide is produced by reacting the above phosphonic acid with a reagent such as phosphorus pentachloride, phosphorus trichloride or thionyl chloride. Treating said acid halide with a base such as sodium bicarbonate yields trans-o, m, or p-cyano-cyclohexane-phosphonic acid. The compound thus obtained is hydrogenated to give trans-o, m, or p-aminomethyl-cyclohexane-phosphonic acid. The preparation of trans-compounds of Formula II wherein the aminoalkyl group is at the para-position is illustrated in Flow Sheet I below. It should be noted, however, that this same procedure may be employed for the preparation of the trans o- and m-aminoalkyl moieties.

FLOW SHEET

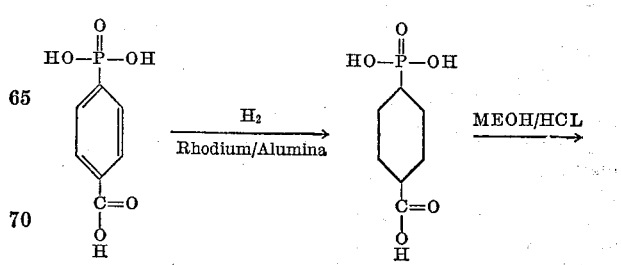

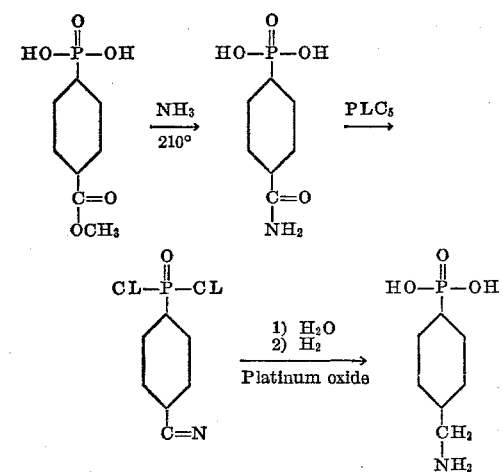

One skilled in the art will readily appreciate that in addition to the aminomethyl phosphonic compounds of the invention, the equivalent aminoalkyl phosphonic acids of the formulas:

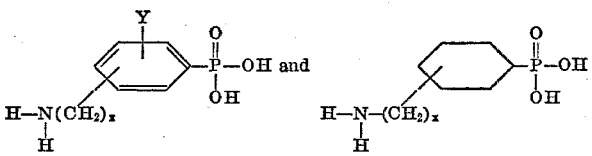

wherein Y is hydrogen of halogen such as fluorine, bromine, chlorine and the like and X equals integers ranging from 2 to 4 may be employed in the practice of the invention.

The pharmaceutically acceptable salts of the anti-fibrinolytic phosphonic acid compounds are to be considered as included within the scope of the invention. Representative examples of said pharmaceutically acceptable salts are the hydrohalide, sulfate, citrate and tartrate salts of the amino group; the sodium, potassium, calcium, and magnesium salts of the phosphonic acid group; and the zwitterion (inner salt) which is the positively charged amion group and the negatively charged phosphonic acid group. The zwitterion (inner salt) is represented by the structure below:

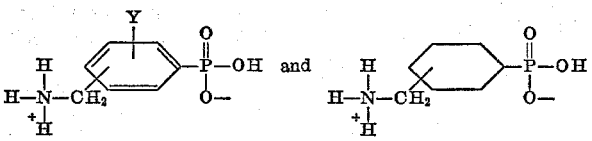

The compounds of this invention are administered orally, intravenously or intramuscularly. Of particular preference is the oral form ranging from 10 to 100 mg./kg. of body weight per day. Of preference is 20–80 mg./kg. of body weight per day for varying periods of treatment as required.

For these purposes the compounds of the invention may be administered orally and parenterally in dosage unit formulations containing conventional non-toxic pharmaceutically acceptable carriers, adjuvants and vehicles. The term parenteral as use herein includes intravenous or intramuscular. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous, or oily suspensions, dispersible powders, or granules, emulsions, hard or soft capsules, syrups, or elixirs. Compositions intended for oral use may be prepared according to any method known to the art for the manufacture of pharmaceutical compositions and such compositions may contain one or more agents selected from the group consisting of sweetening agents, flavoring agents, colouring agents and preserving agents in order to provide a pharmaceutically elegant and palatable preparation. Tablets contain the active ingredient in admixture with non-toxic pharmaceutically acceptable excipients which are suitable for manufacture of tablets. These excipients may be, for example, inert diluents, such as calcium carbonate, sodium carbonate, lactose, calcium phosphate or sodium phosphate; granulating and disintegrating agents, for example maize starch or alginic acid; binding agents, for example starch, gelatine or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate above or with a wax may be employed.

Formulations for oral use may also be presented as hard gelatine capsules wherein the active ingredient is mixed with an inert solid diluent, for example calcium carbonate, calcium phosphate or kaolin, or as soft gelatine capsules wherein the active ingredient is mixed with water or an oil medium, for example arachis oil, peanut oil, liquid paraffin or olive oil.

Aqueous suspensions contain the active materials in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation produces of an alkylene oxide with fatty acids, for example, polyoxyethylene stearate, or condensation products of ethylene oxide with long chain aliphatic alcohols, for example, heptadecaethyleneoxycetanol, or condensation products of ethylene oxide with partial esters derived from fatty acids and a hexitol such as polyoxyethylene sorbitol mono-oleate, or condensation products of ethylene oxide with partial esters derived from fatty acids and hexitol anhydrides, for example, polyoxyethylene sorbitan mono-oleate. The said aqueous suspensions may also contain one or more preservatives, for example, ethyl of n-propyl p-hydroxy benzoate, one or more colouring agents, one or more flavouring agents and one or more sweetening agents, such as sucrose or saccharin.

Oily suspensions may be formulated by suspending the active ingredient in a vegetable oil, for example, arachis oil, olive oil, sesame oil, or coconut oil, or in a mineral oil such as liquid paraffin. The oily suspensions may contain a thickening agent, for example, beeswax, hard paraffin or cetyl alcohol. Sweetening agents, such as those set forth above, and flavouring agents may be added to provide palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavouring and colouring agents, may also be present.

The pharmaceutical compositions of the invention may also be in the form of oil-in-water emulsions. The oily phase may be a vegetable oil, for example, olive oil or arachis oils, or a mineral oil, for example, liquid paraffin or mixtures of these. Suitable emulsifying agents may be naturally-occurring gums, for example, gum acacia or gum tragacanth, naturally-occurring phosphatides, for example soya bean lecithin, and esters or partial esters derived from fatty acids and hexitol anhydrides, for example, sorbitan mono-oleate, and condensation products of the said partial esters with ethylene oxide, for example, polyoxyethylene sorbitan mono-oleate. The emulsions may also contain sweetening and flavouring agents.

Syrups and elixirs may be formulated with sweetening agents, for example glycerol, sorbitol or sucrose. Such formulations may also contain a dumulcent, a preservative and flavouring and colouring agents.

For intravenous and intramuscular administrations, the pharmaceutical compositions may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butanediol. Among the acceptable vehicles and solvents that may be employed are water, Ringer's solution, and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectibles.

The amount of active ingredient that may be combined with the carrier materials to produce a single dosage form will vary depending upon the host treated and the particular mode of administration. For example, a formulation intended for the oral administration of humans may contain from 5 mg. to 100 grams of active agent compounded with an appropriate and convenient amount of carrier material which may vary from about 5 to about 95 percent of the total composition. Dosage unit forms will generally contain between from about 175 mg. to about 1.75 g. of active ingredient.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

The following examples illustrate the preparation of the various phosphonic acid compounds described as antifibrinolytic agents. The examples should be construed as illustrations of the invention rather than limitations thereof.

EXAMPLE 1

4-aminomethyl-2-fluoro-benzene phosphonic acid (A) To a mixture containing 1.92 g. of 2-fluorophosphanilic acid and 5 ml. of 6 N hydrochloric acid at 0° C. is added a solution of 0.7 g. of sodium nitrite in 2 ml. of water. The reaction is neutralized with sodium bicarbonate and the mixture added dropwise to a solution containing 2.2 g. of cuprous chloride, 1.3 g. of sodium cyanide and 8 ml. of water. After standing at room temperature for 18 hours, the mixture is heated with charcoal for 5 minutes, then acidified to pH 4 with hydrochloric acid and filtered. The filtrate is made alkaline with ammonium hydroxide and to it is added 5 g. of magnesium chloride hydrate. The first formed precipitate is filtered off and the filtrate heated for 15 minutes giving an orange precipitate which is the magnesium salt of 2-fluoro-4-cyano benzene phosphonic acid.

The orange precipitate is dissolved in 6 ml. of sodium hydroxide and after removal of the precipitated magnesium hydroxide, the solution is hydrogenated in the presence of ruthenium/carbon catalyst at 40 p.s.i. for 18 hours. After removal of the catalyst by filtration, acidification to pH 3 with hydrochloric acid gives 4-aminomethyl - 2 - fluorobenzene - phosphonic acid, M.P. 300° C.

(B) The example of 1A is repeated except that the starting material is 2-chloro-phosphanilic acid. Using the same reaction conditions and techniques, there is obtained 4-aminomethyl-2-chloro-benzene-phosphonic acid.

(C) The example of 1A is repeated except that the starting material is 3-fluoro-phosphanilic acid. Using the same reaction conditions and techniques, there is obtained 4-aminomethyl-3-fluoro-phosphanilic acid.

(D) The example of 1A is repeated except that the starting material is 3-fluoro-5-phosphanilic acid. Using the same reaction conditions and techniques, there is obtained 3-fluoro - 5 - aminomethyl-benzene-phosphonic acid.

(E) The example of 1A is repeated except that the starting material is 2-fluoro-5-phosphanilic acid. Using the same reaction conditions and techniques, there is obtained 2-fluoro-5-aminomethyl-benzene-phosphonic acid.

EXAMPLE 2

Cis 4-aminomethyl cyclohexane phosphonic acid hydrochloride (A) A solution containing 11.97 g. of 4-aminomethyl benzene phosphonic acid and 115 ml. of 4 N hydrochloric acid is hydrogenated at 40 p.s.i. in the presence of 6.0 g. of 5% rhodium/alumina catalyst until the uptake is complete. The catalyst is filtered off and the filtrate evaporated to dryness. The dry cake is triturated with 100 ml. of ethanol, filtered and the residual solid washed successively with 1:1 ethanol/ether and ether, yielding cis 4-aminomethyl-cyclohexane phosphonic acid hydrochloride M.P. 180°–190° (dec.).

457 mg. of the above hydrochloride dissolved in methanol is treated with 0.260 ml. of triethylamine to yield cis-4-aminomethyl-cyclohexane phosphonic acid as its inner salt.

(B) The example of 2A is repeated except that the starting material is 3-aminomethyl-benzene-phosphonic acid. Using the same reaction conditions and techniques there is obtained cis-3-aminomethyl-cyclohexane phosphonic acid hydrochloride.

(C) The example of 2A is repeated except that the starting material is 2 - aminomethyl-benzene-phosphonic acid. Using the same reaction conditions and techniques, there is obtained cis-2-aminomethyl-benzene-phosphonic acid hydrochloride.

EXAMPLE 3

Trans-4-aminomethyl-cyclohexane phosphonic acid (A) Cis - 4 - methoxycarbonyl - cyclohexane phosphonic acid.—30 g. of 4-carboxy phenyl phosphonic acid in 500 ml. of water is hydrogenated at 40 p.s.i. in the presence of 10 g. of rhodium/alumina catalyst for 18 hours. The catalyst is filtered off, filtrate evaporated to 100 ml. and added to the filtrate 10 ml. of concentrated hydrochloric acid causing the precipitation of 4-carboxycyclohexane phosphonic acid (M.P. 225° C.). The acid is esterified by refluxing in methanol for 2 hours while passing in hydrochloride gas to give predominantly cis-4 - methoxycarbonyl - cyclohexane - phosphonic acid (M.P. 147–152° C.). Said acid may be recrystallized to constant melting-point from methanol-ether (M.P. 154°–155°).

(B) Trans - 4 - carbamoyl - cyclohexane - phosphonic acid.—The crude ester obtained in Step (A) is treated with 500 ml. of liquid ammonia and 500 ml. of methanol in a steel autoclave at 210° C. for 18 hours. The solution is evaporated to give predominantly trans-4-carbamoyl-cyclohexane phosphonic acid ammonium salt M.P. 252°–258° C., obtained crystalline by dissolving the residue in water followed by precipitation with ethanol. The free acid M.P. 234° (dec.) is obtained by acidification with hydrochloric acid.

(C) Trans - 4 - cyano - cyclohexane - phosphonyl dichloride.—1.7 g. of the above trans-4-carbamoyl-cyclohexane phosphonic acid and 5.1 g. of phosphorus pentachloride are heated at 160° C. for 20 minutes and distilled at 0.2 mm. pressure. The yellow distillate crystallizes and trans-4-cyano-cyclohexane phosphonyl dichloride M.P. 82° C. is obtained by trituration with ether and filtered.

(D) 1.13 g. of the above trans - 4 - cyano cyclohexane phosphonyl dichloride is dissolved in 20 ml. of water containing 1.28 g. of sodium bicarbonate. 5 ml. of N hydrochloric acid is added to the solution containing 4-cyano-cyclohexane-phosphonic acid, which is then degassed and hydrogenated at 400 p.s.i. in the presence of 0.2 g. of platinum oxide for three hours. The catalyst is filtered off and the filtrate acidified with hydrochloric acid and evaporated to dryness. The residue is taken up in methanol, filtered to remove sodium chloride. Ether is added to the filtrate to precipitate trans-4-aminomethyl-cyclohexane phosphonic acid hydrochloride. The precipitate is dissolved in a minimum amount of methanol and treated with methanolic-ammonia to precipitate predominantly trans-4-aminomethyl cyclohexane phosphonic acid (M.P. dec. 300). The acid is recrystallized in 6 ml. water followed by the addition of 24 ml. methanol yielding pure trans - 4 - aminomethyl-cyclohexane phosphonic acid hydrate.

Elemental analysis.—Calcd. (percent): C, 43.5; H, 8.34; N, 7.25. Found (percent): C, 43.3; H, 8.23; N, 7.01.

EXAMPLE 4

Trans-3-aminomethyl cyclohexane phosphonic acid (A) The example of 3A is repeated except that the starting material is 3-carboxy phenyl phosphonic acid. Using the same reaction conditions and techniques, there is obtained cis - 3 - methoxycarbonyl-cyclohexane-phosphonic acid.

(B) The example of 3B is repeated except that the starting material is cis - 3 - methoxycarbonyl - cyclohexane-phosphonic acid obtained in 4A. Using the same reaction conditions and techniques, there is obtained trans-3-carbamoyl-cyclohexane-phosphonic acid.

(C) The reaction of 3C is repeated except that the starting material is trans-3-carbamoyl-cyclohexane-phosphonic acid obtained in 4B. Using the same reaction conditions and techniques, there is obtained trans - 3-cyano-cyclohexane phosphonyl dichloride.

(D) The reaction of 3D is repeated except that the starting material is trans - 3 - cyano - cyclohexane phosphonyl dichloride obtained in 4C. Using the same reaction conditions and techniques, there is obtained trans-3-aminomethyl-cyclohexane-phosphonic acid.

EXAMPLE 5

Trans-2-aminomethyl-cyclohexane-phosphonic acid (A) The example of 3A is repeated except that the starting material is 2-carboxy phenyl-phosphonic acid. Using the same reaction conditions and techniques, there is obtained cis - 2 - methoxy-carbonyl-cyclohexane phosphonic acid.

(B) The example of 3B is repeated except that the starting material is cis - 2 - methoxycarbonyl - cyclohexane-phosphonic acid obtained in 5A. Using the same reaction conditions and techniques there is obtained trans-2-carbamoyl-cyclohexane-phosphonic acid.

(C) The example of 3C is repeated except that the starting material is trans - 2 - carbamoyl - cyclohexane phosphonic acid obtained in 5B. Using the same reaction conditions and techniques, there is obtained trans-2-cyano-cyclohexane-phosphonic acid.

(D) The example of 3D is repeated except that the starting material is trans - 2 - cyano - cyclohexane-phosphonic acid obtained in 5C. Using the same reaction conditions and techniques, there is obtained trans - 2 - aminomethyl-cyclohexane-phosphonic acid.

We claim:
1. A method of treating a patient afflicted with a pathological fibrinolytic state which comprises the administration to a patient of an anti-fibrinolytic effective amount of a compound of the formula:

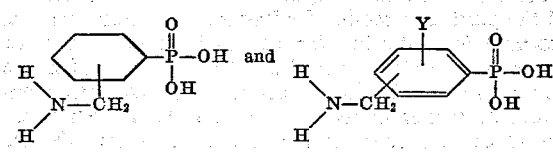

or pharmaceutically acceptable salt thereof wherein Y is halogen or hydrogen.

References Cited

UNITED STATES PATENTS 3,442,938    5/1969    Christen et al. _____ 260—502.5

OTHER REFERENCES

Doak et al., J. Am. Chem. Soc., vol. 81 (1959), pp. 3021–3.

Doak et al., J. Am. Chem. Soc., vol 74 (1952), pp. 753–4.

STANLEY J. FRIEDMAN, Primary Examiner

U.S. Cl. X.R.

260—502.5